INVENTORS
TSUNEO NAKAI, SETSUJI MINEHISA,
YOSHIO FUCHINO AND HISAO TSUCHIHIRA
BY
Linton and Linton
ATTORNEYS United States Patent Office
3,446,931
Patented May 27, 1969

3,446,931
METHOD FOR FIXING A BACKWAVE DEPOSITED METAL ONTO THE BEVELING ROOT
Tsuneo Nakai, Setsuji Minehisa, Yoshio Fuchino, and Hisao Tsuchihira, Osaka-shi, Japan, assignors to Hitachi Zosen Kabushiki Kaisha, Osaka-shi, Japan
Filed July 2, 1964, Ser. No. 379,912
Claims priority, application Japan, Sept. 14, 1963, 38/49,685; Dec. 14, 1963, 38/67,468
Int. Cl. B23k 9/18, 25/00, 35/22
U.S. Cl. 219—73            1 Claim

ABSTRACT OF THE DISCLOSURE

A submerged arc welding process is performed only from the front surfaces of base metal workpieces without the use of a backing member and whereby completely welded metal is deposited on and fixed to the rear surface of the base metal. A V-shaped groove is provided at the adjoining edges of the workpieces and the groove is filled with a flux consisting of 35–40% fluorite, 10–30% silicon iron, 2–7% aluminum oxide, 3–8% sodium bicarbonate, 0–5% cryolite and 3–8% sodium silicate. As the weld is carried out the flux forms a slag of sufficient viscosity to form a backwave deposited bead.

---

The present invention is concerned with a welding method for fixing a backwave deposited metal onto the rear surface of adjacent workpieces.

The submerged arc welding method applied to weldings in the building of welded structures with butt welding joints and fillet welding joints is a method of arc welding by thrusting a bare rod-electrode into the flux filled up over the joints, and the said method is widely known as Union-melt welding method, as is so commonly called.

A backing strip has heretofore been used in order to prevent the melt-downs of molten metal when butt welding in conducted by the submerged arc welding method in the case where the thickness of a plate to be welded is not so great and the dimensions of the butt faces of plates or so-called root faces are not deep enough to support the molten metal, or in the case where, even though the plate thickness is great, a sufficient penetration is desired as deep as to the backside of the plate by welding from one side of the plates.

Figure 1A:
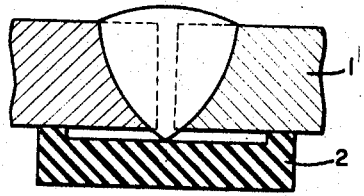
Figure 1B:
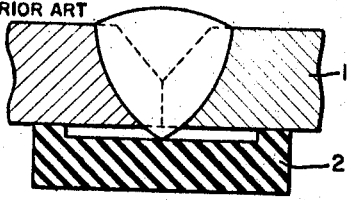
Figure 1C:
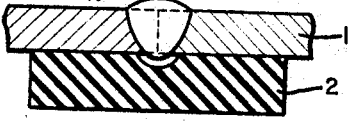
Figure 1D:
Figure 2:
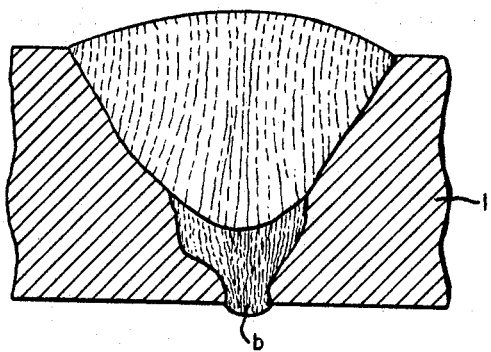
Figure 3:
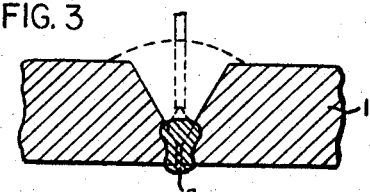

The present invention will be better understood and objects and advantages hereof will become apparent through the following illustration taken in connection with the drawings, in which:

FIGS. 1(a), (b), (c) and (d) are cross sectional views showing various kinds of back strips employed by the conventional methods for submerged arc welding;

FIG. 2 is a cross-sectional view of a weld according to the method of the present invention; and FIG. 3 is an enlarged cross-sectional view of the complete weld.

In general, submerged welding is effected from both the front and rear surfaces of a base metal. If a submerged welding is to be effected from only the front surface of a base metal, it is required that a backing strip of other backing material is utilized as shown in FIGS. 1(a), (b), (c), and (d) of FIG. 1 showing backing strips 2 attached depending upon the thickness of the base metal 1 and the shape of the groove, in which (a) shows an I-shaped single groove of a thick base metal, (b) shows a V-shaped single groove of a thick base metal, and (c) and (d) show I-shaped grooves of a thin base metal. The backing strip is normally a copper plate. Now by virtue of the present invention, such backing material or strip as above becomes unnecessary. It is to be seen that it is also unnecessary to turn the base metal upside down which is necessary for the double groove joint or both side welding, so that the preparation for a welding operation becomes simple and the cost therefore becomes inexpensive.

As seen in the above-said methods of welding, there has been the fatal shortcoming with the conventional methods that a troublesome backing strip must necessarily be used.

Moreover, in the case where the thickness of a material plate is great and the dimensions of the butt face (root face) may be made sufficient, that is, even in the case where the dimensions of the root face are deep enough to support the molten metal, those methods used to require to determine the gap between butt faces as less than 0.8 mm., and in case where there may be a gap more than that, a troublesome procedure was required such as to weld from the backing side first and then to turn the material upside down and weld from the finishing side upon having the said gap blocked up manually.

The present invention aims at furnishing a welding method for forming bead waves on the backside of the workpiece as well as furnishing an effective flux to be employed for this method by using an ordinary submerged arc welder, welding from the front side and obtaining a sufficient penetration on the backside of the beveling face without resorting to the strip backing means as aforementioned, forming the bevel into the shape having a root face, or turning the material upside down.

One of the features of the present invention resides in the point that the bevel of adjacent workpieces 1 form a V shape; its backside is left open; a flux whose ingredients are mostly calcium carbonate, fluorite and silicon iron is filled up in the bevel in a certain amount; and a certain backwave deposited metal is fixed onto the beveling root by a submerged arc welder.

Another feature thereof lies in the flux for submerged arc welding which is composed mainly of fluorite, silicon iron and calcium carbonate, added in small rates with aluminum oxide, sodium bicarbonate, cryolite and sodium silicate, as it contains them respectively.

The mixing rate of each component of the said flux will be proper, as the result from preferred examples, if taken from the following:

A flux which is prepared by adding, and contains, fluorite in the range of 35–40%, silicon iron in the range of 10–30%, calcium carbonate in the range of 10–20%, aluminum oxide in the range of 2–7%, sodium bicarbonate in the range of 3–8%, cryolite in the range of 0–5% and sodium silicate in the range of 3–8% presents an excellent backwave form as the result of being used in welding, and therefore the said mixing rates are recommended as most suitable in practice.

An illustration will be made on the preferred examples of the present invention as follows: That is to say, in one of the numerous tests done under the welding conditions: there was used a core of U.S. #43–5/32", a current of 480–530 amperes, a voltage of 26–32 volts, and a welding velocity of 60–70 cm./min., for a base metal whose bevel is 45–60°; the vertical gap of whose beveling root is 2.0–2.5 mm.; and the height of whose vertical part is 4 mm., such a flux as above-mentioned whose principal components are calcium carbonate, fluorite, and silicon iron is filled up onto the said bevel part, and a further weld is carried out therein by a submerged arc welder, whereupon the spread of the molten metal is quick and is deposited onto the beveling vertical part as shown in FIG. 2 while also the molten metal that hangs down to the lower end of the backside of the bevel by virtue of the viscosity and surface tension of molten slag takes a form of a certain size of arc surface and solidifies so that a backwave deposited metal b of a shape such as shown in FIG. 3 may be obtained. And, in the said welding, silicon iron enhances the fluidity of deposited metal so as to better the spread thereof toward the beveling root, and fluorite intensifies the viscosity and surface tension of molten slag so as to forestall drops of the molten metal hanging onto the backside of the bevel, so that both act as to produce uniform bead waves. Furthermore, calcium carbonate is necessary in the smelting reaction of molten metals. And the secondary ingredients of aluminum oxide, sodium bicarbonate and cryolite are all added as slag forming agents, and by blending these materials in the rates of small amount the slag formation amount on both back and front sides of the welded bevel part is augmented, both back and front sides of deposited steel are sufficiently covered so that the said steel is prevented from being suddenly cooled, thus the structure of the deposited metal is obtained and the bead surface is well formed. In addition, sodium silicate has been added as a bonding agent in a required amount when the flux is sintered.

The results of tension tests as well as bending tests of the weld parts of the materials welded under the foregoing conditions and according to the above-mentioned manner showed very excellent results as shown in the following table, and therefore, the product of the present invention is possessed of superiority that bears comparison with the conventional submerged arc welding joints.

The result of tension and bending tests of joints:

Tension strength, kg./mm.$^2$ _____ 49–2.
Guide bending (bending radius=$2t$) __ Excellent, 180°.
Impact value at 0° C., kg.-m./cm.$^2$ ____ 5.2.

In addition, as the result of the observation of the conditions of the test pieces subsequent to the aforementioned tension tests and bending tests, it was found out in the tension tests that breaking would not occur in deposited steel but would occur in the base metal, and it was confirmed in the bending tests on joints that no defect would be with the welded part and a complete bend at 180° would take place.

Compared to a conventional flux, the viscosity of deposited metal will decrease by several ten percents while the viscosity of molten slag will increase by several ten percents, so that this certainly will outstandingly contribute to the formation of a uniform and effective backwave deposited metal part as described in the above; as aforementioned, in addition, there has been no other alternative but welding one side (backside) of a material and thereafter welding the other side upon turning 180° or resorting to a means of troublesome strip backing when welding from one side alone, but the present invention requires no means of inverting operation and backing strip at all and is realizable by simply welding from one side so that this will be able to greatly shorten the building process of any structures.

What is claimed is:

1. A method of welding adjoining base metal workpieces from one side thereof without backing means and depositing a bead on the other surface of said base metal consisting in providing a V-shaped groove between the workpieces having a root opening for a butt joint weld, filling said groove with a flux consisting of 35–40% fluorite, 10–30% silicon iron, 10–20% calcium carbonate, 2–7% aluminum oxide, 3–8% sodium bicarbonate, 0–5% cryolite and 3–8% sodium silicate and welding said flux from said one side of the workpieces whereby a constant bead is formed alongside said root opening in said other surface and fixed thereto.

References Cited

UNITED STATES PATENTS

| | | | |
|---|---|---|---|
| 1,650,905 | 11/1927 | Mills | 219—146 |
| 2,489,002 | 11/1949 | Babbitt | 219—73 |
| 2,587,251 | 2/1952 | Christiaan van der Willigen | 219—137 |
| 2,965,524 | 12/1960 | Claussen et al. | 219—146 X |
| 3,153,719 | 10/1964 | Arikawa et al. | 219—73 |

RICHARD M. WOOD, *Primary Examiner.*

J. G. SMITH, *Assistant Examiner.*

U.S. Cl. X.R.

219—146